(12) United States Patent
Sharma et al.

(10) Patent No.: US 11,761,371 B2
(45) Date of Patent: Sep. 19, 2023

(54) THERMOSTAT HOUSING FOR ENGINE SYSTEM

(71) Applicant: Powerhouse Engine Solutions Switzerland IP Holding GmbH, Zug (CH)

(72) Inventors: Amit Kumar Sharma, Bangalore (IN); Jason Lymangrover, Harborcreek, PA (US); Sandeep Kanzal Venkatesha, Bangalore (IN)

(73) Assignee: POWERHOUSE ENGINE SOLUTIONS SWITZERLAND IP HOLDING GMBH, Zug (CH)

( * ) Notice: Subject to any disclaimer, the term of this patent is extended or adjusted under 35 U.S.C. 154(b) by 37 days.

(21) Appl. No.: 17/367,081

(22) Filed: Jul. 2, 2021

(65) Prior Publication Data

US 2022/0010719 A1    Jan. 13, 2022

(30) Foreign Application Priority Data

Jul. 10, 2020   (IN) .............................. 202041029450

(51) Int. Cl.
  *F01P 7/16*   (2006.01)
  *B61C 5/00*   (2006.01)
  *F01P 5/10*   (2006.01)
  *F01P 7/14*   (2006.01)

(52) U.S. Cl.
  CPC ..................... *F01P 7/16* (2013.01); *B61C 5/00* (2013.01); *F01P 5/10* (2013.01); *F01P 2007/146* (2013.01)

(58) Field of Classification Search
  CPC .......... F01P 7/16; F01P 5/10; F01P 2007/146; B61C 5/00
  See application file for complete search history.

(56) References Cited

FOREIGN PATENT DOCUMENTS

| DE | 112018000019 T5 | 12/2018 | |
|----|-----------------|---------|---|
| DE | 102017221942 A1 | 3/2019 | |
| DE | 102018127951 A1 * | 6/2019 | ............... F01P 3/02 |
| DE | 102018127951 A1 | 6/2019 | |
| JP | 2002266641 A | 9/2002 | |

OTHER PUBLICATIONS

Machine Translation of DE102018127951A1 PDF file name: "DE102018127951A1_Machine_Translation.pdf".*

* cited by examiner

*Primary Examiner* — Grant Moubry
*Assistant Examiner* — Ruben Picon-Feliciano
(74) *Attorney, Agent, or Firm* — McCoy Russell LLP

(57) ABSTRACT

Systems are provided for a thermostat housing positioned in an internal combustion engine system. In one example, the internal combustion engine system may include the thermostat housing and one or more thermostat valves positioned within the thermostat housing, wherein the thermostat housing may include a plurality of plate configurations. In some examples, the plurality of plate configurations may include an upper plate configuration and a lower plate configuration. The upper plate configuration may include an upper plate coupled to an upper flange of a casing of the thermostat housing. The lower plate configuration may include a lower plate coupled to a lower partition of the casing of the thermostat housing. In some examples, the upper and lower plate configurations may include a plurality of openings defined fit to the one or more thermostat valves.

19 Claims, 6 Drawing Sheets

US 11,761,371 B2

THERMOSTAT HOUSING FOR ENGINE SYSTEM

CROSS REFERENCE TO RELATED APPLICATIONS

The present application claims priority to Indian Patent Application No. 202041029450, entitled "THERMOSTAT HOUSING FOR ENGINE SYSTEM," and filed on Jul. 10, 2020. The entire contents of the above-listed application are hereby incorporated by reference for all purposes.

BACKGROUND

Technical Field

Embodiments of the subject matter disclosed herein relate to systems for a thermostat housing.

Discussion of Art

Vehicles, such as rail vehicles, may include power sources, such as diesel internal combustion engines. Such vehicles may include one or more thermostat valves for distributing fluids between an engine and an engine cooling system. The one or more thermostat valves may be included in a thermostat housing, where the thermostat housing may provide one or more chambers which may be fluidly coupled via actuation of the one or more thermostat valves. Accordingly, an engine coolant may enter one of the one or more chambers via an inlet and may exit an outlet via another one of the one or more chambers upon actuation of the one or more thermostat valves.

In general, thermostat valves may function via expansion and contraction of thermal expansion elements. During such expansion/contraction, a given thermostat valve may become unseated within the thermostat housing, resulting in unexpectedly advanced or delayed engine coolant distribution. When multiple thermostat valves are included within the thermostat housing, such unexpected distribution of the engine coolant may be uncontrollably compounded and precision control of the engine cooling system may be difficult to achieve. When a given thermostat valve fails, it may be stuck against a rim of a corresponding opening. Sticking may hamper control of the given thermostat valve. It may be desirable to have a thermostat valve that differs in function and/or structure from those that are currently available.

BRIEF DESCRIPTION

In one embodiment, an internal combustion engine system may include a thermostat housing, the thermostat housing including a plurality of chambers separated by a plurality of plate configurations, and one or more thermostat valves positioned within the thermostat housing, wherein each of the plurality of plate configurations includes a plurality of openings defined fit to the one or more thermostat valves, and respective plates fastened to a casing of the thermostat housing.

DETAILED DESCRIPTION

Figure 1:
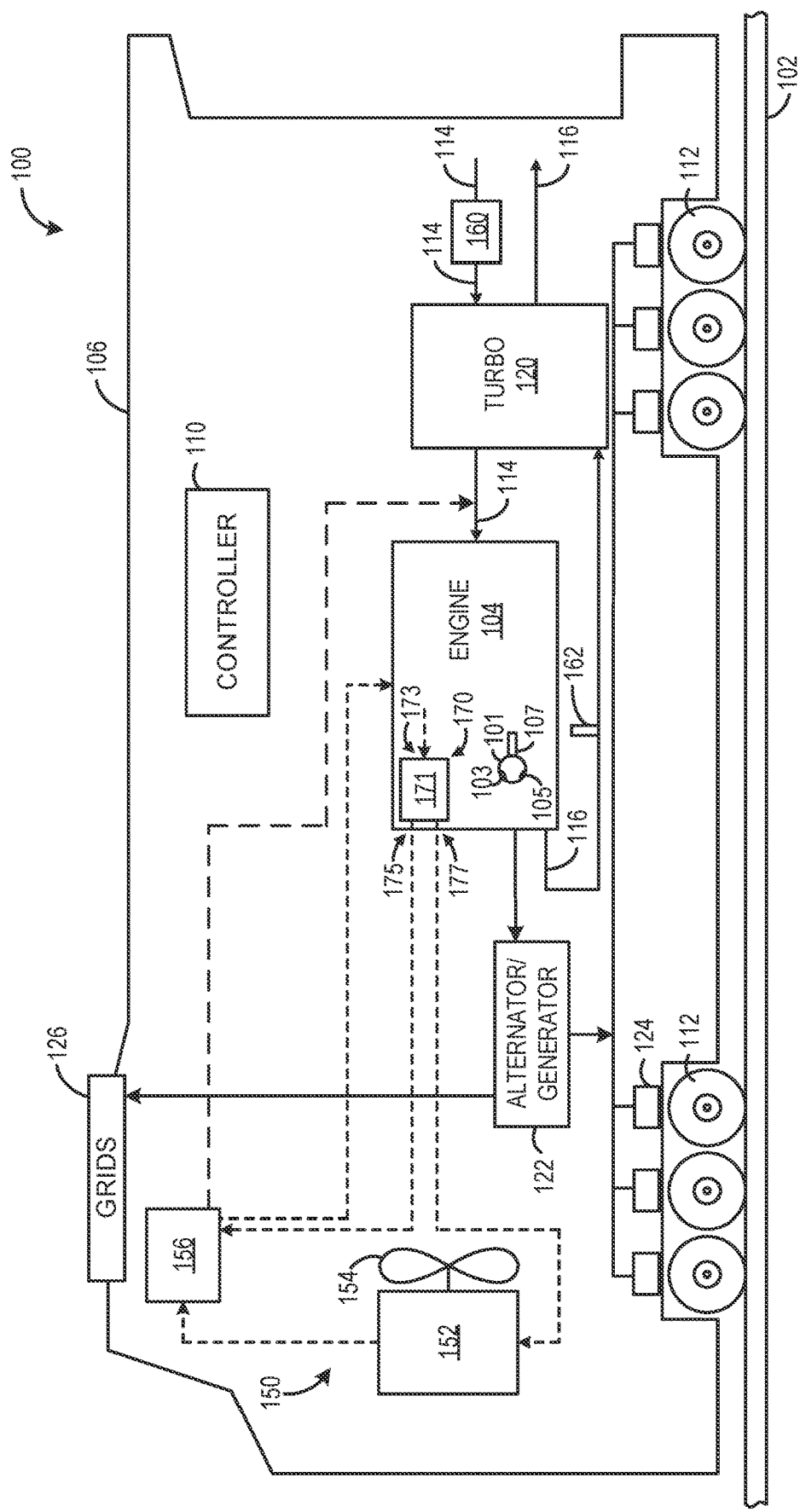
FIG. 1 shows a schematic diagram of a vehicle with an engine including a thermostat housing at least partially enclosing one or more thermostat valves, according to an embodiment of the present disclosure.

Embodiments of the invention are disclosed in the following description, and may relate to an internal combustion engine system having a thermostat housing. Such an engine system may be positioned in a vehicle system. Suitable thermostat housings may store one or more thermostat valves which operate by expansion and contraction of respective thermal expansion elements. Aspects of the invention may reduce or eliminate various sources of random error and/or systematic error (e.g., within a given embodiment of the internal combustion engine system), such as manufacturing tolerances and/or a composition of the thermal expansion element, and therefore may reduce or eliminate the unseating of a thermostat valve. In examples where the thermostat housing houses a single thermostat valve, the thermostat housing may be conformed to the single thermostat valve. Conformal configurations may mitigate the unseating of the thermostat valve.

A technical effect for one embodiment of a thermostat housing having multiple thermostat valves is that the multiple thermostat valves may remain seated over multiple thermal cycles. In one embodiment, a plurality of thermostat valves may extend through a plurality of chambers within a thermostat housing. A use for the plurality of thermostat valves may include graduated, precision control of fluids passing therethrough. This control may account for thermal variations. In one embodiment, one or more plates or plate configurations may respectively bisect pairs of the plurality of chambers, the one or more plates or plate configurations including openings with respective defined fits to the plurality of thermostat valves. Suitable defined fits may include one or more of a clearance fit, a transition fit, and an interference fit. A clearance fit is where the dimensions of a hole and a shaft or object are such that there is a clearance or gap that exists between the hole and the shaft or object. In one embodiment, a difference tolerance between the dimensions of the hole and the shaft or object may be between ~60 to ~90 microns (e.g., within 5% of 60 microns to within 5% of 90 microns). Suitable types of clearance fits may include one or more of a slide fit and a running fit. Suitable slide fits may include an easy slide fit. Suitable running fits may include one or more of a slack running fit and a loose running fit. A transition fit is where the dimensions of the hole has negligible clearance with or is fractionally smaller than the dimensions of the shaft or object such that a relatively small amount of force may be employed to insert or remove the shaft or object from the hole. An interference fit is where the dimensions of the hole are smaller than the dimensions of the shaft or object such that a relatively large amount of force may be employed to insert or remove the shaft or object from the hole (e.g., where the relatively large amount of force may be greater than the relatively small amount of force employed for inserting or removing a shaft or object transition fit to a hole).

FIG. 1 shows an embodiment of a system in which one or more thermostat valves may be installed. Specifically, FIG. 1 shows a block diagram of an embodiment of a vehicle system 100. In the illustrated example, an engine 104 (e.g., an internal combustion engine, such as a high-speed diesel engine) is coupled to a vehicle which is depicted as a rail vehicle 106 (e.g., locomotive). The vehicle can run on a rail 102 via a plurality of wheels 112. As depicted, the vehicle may include the engine 104. The engine may include a plurality of cylinders 101 (only one representative cylinder shown in FIG. 1) that each include at least one intake valve 103, exhaust valve 105, and fuel injector 107 (e.g., one or more electrically-actuated fuel injectors). Each intake valve 103, exhaust valve 105, and fuel injector 107 may include an actuator that may be actuated via a signal from a controller 110 of the engine. In other non-limiting embodiments, the engine may be in a stationary platform. Suitable stationary platforms may include a power-plant application. Other suitable vehicles may include a marine vessel, mining or industrial equipment, on-road vehicles, and off-highway vehicle propulsion systems.

The engine may receive intake air for combustion from an intake passage 114. The intake passage 114 may include an air filter 160 that filters air from outside of the vehicle. Exhaust gas resulting from combustion in the engine may be supplied to an exhaust passage 116. Exhaust gas may flow through the exhaust passage, and out of an exhaust stack of the rail vehicle. The exhaust passage may include an exhaust gas sensor 162, which may monitor a temperature and/or an air-fuel ratio of the exhaust gas, and which may be coupled to the controller to provide monitoring data thereto.

In one example, the engine may be a diesel engine that combusts air and diesel fuel through compression ignition. In another example, the engine may be a dual or multi-fuel engine that may combust a mixture of gaseous fuel and air upon injection of diesel fuel during compression of the air-gaseous fuel mixture. In other non-limiting embodiments, the engine may additionally combust fuel including gasoline, kerosene, natural gas, biodiesel, or other petroleum distillates of similar density through compression ignition (and/or spark ignition).

A suitable rail vehicle may be a diesel-electric locomotive. Suitable diesel-electric locomotives may include mainline haulers, heavy haul freight haulers, passenger rail vehicles, shunters, switchers, and the like. The diesel-electric locomotive may include other power sources, such as hybrid electric (batteries), fuel cells, hydrogen engines, and the like. While diesel is used as an example fuel, other fuels may be used. Suitable other fuels may include gasoline, kerosene, ethanol, biodiesel, natural gas, and combinations of the foregoing. As depicted in FIG. 1, the engine may be coupled to an electric power generation system, which includes an alternator/generator 122 and a plurality of electric traction motors 124. For example, the engine may be a diesel and/or natural gas engine that generates a torque output which may be transmitted to the alternator/generator, the alternator/generator being mechanically coupled to the engine. In one embodiment herein, the engine may be a multi-fuel engine operating with diesel fuel and natural gas.

Electrical power produced by the alternator/generator may be stored and applied for subsequent propagation to a variety of downstream electrical components. As an example, the alternator/generator may be electrically coupled to the plurality of electric traction motors and the alternator/generator may provide electrical power to the plurality of electric traction motors. As depicted, each of the plurality of electric traction motors may be coupled to one of the plurality of wheels to provide tractive power to propel the rail vehicle. One example configuration may include one electric traction motors per wheel set (e.g., a subset of the plurality of wheels). As depicted herein, six electric traction motors may correspond to each of six pairs of motive wheels of the rail vehicle. In another example, the alternator/generator may be coupled to one or more resistive grids 126. The resistive grids may dissipate excess engine torque via heat produced by the grids from electricity generated by the alternator/generator. Additionally or alternatively, the resistive grids may be used in dynamic braking mode to dissipate electricity generated by the traction motors.

In some embodiments, the vehicle system may include a turbocharger 120 arranged between the intake passage 114 and the exhaust passage 116. The turbocharger may increase air charge of ambient air drawn into the intake passage to provide greater charge density during combustion to increase power output and/or engine-operating efficiency. The turbocharger may include at least one compressor (not shown) which may be at least partially driven by at least one corresponding turbine (not shown). In some embodiments, the vehicle system may include an aftertreatment system coupled in the exhaust passage upstream and/or downstream of the turbocharger. In one embodiment, the aftertreatment system may include a diesel oxidation catalyst (DOC) and/or a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or exhaust aftertreatment systems.

As depicted in FIG. 1, the vehicle system may include a thermal management system 150 (e.g., engine cooling system). The cooling system may circulate coolant (e.g., water, glycol, etc.) through the engine to absorb waste engine heat and distribute the heated coolant to a heat exchanger, such as a radiator 152 (e.g., radiator heat exchanger). A suitable coolant may be water. A fan 154 may be coupled to the radiator to maintain an airflow through the radiator when the vehicle is moving slowly or stopped while the engine is running. In some examples, a speed of the fan may be controlled by the controller. Coolant which is cooled by the radiator may enter a tank (not shown). The coolant may then be pumped by a water, or coolant, pump 156 back to the engine or to another component of the vehicle system.

The engine may include a thermostat system 170, which may distribute the coolant between the engine and the cooling system 150 via one or more thermostat valves included within a thermostat housing 171 of the thermostat system. The one or more thermostat valves may extend through one or more chambers within the thermostat housing, selectively permitting fluid coupling between a given pair of the one or more chambers via actuation of at least one of the one or more thermostat valves. The thermostat housing may include one or more inlets and outlets fluidly coupling the one or more chambers to the engine and the cooling system. An inlet 173 may receive heated coolant from the engine. The heated coolant may enter one of the one or more chambers and actuate at least one of the one or more thermostat valves, whereby the heated coolant may be returned to the cooling system via a first outlet 175 or a second outlet 177. As shown, the second outlet may direct the heated coolant to the radiator for cooling and the first outlet may direct the heated coolant to the pump 156 for recirculation.

The controller controls various components related to the vehicle. As an example, various components of the vehicle system may be coupled to the controller via a communication channel or data bus. In one example, the controller may include a computer control system. The controller may additionally or alternatively include a memory holding nontransitory computer readable storage media (not shown) including code for enabling on-board monitoring and control of rail vehicle operation. In some examples, the controller may include more than one controller each in communication with one another, such as a first controller to control the engine and a second controller to control other operating parameters of the rail vehicle (such as tractive motor load, blower speed, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the engine and/or the rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the controller may receive signals from various engine sensors including, but not limited to, engine speed, engine load, intake manifold air pressure, boost pressure, exhaust pressure, ambient pressure, ambient temperature, exhaust gas temperature, exhaust gas air-fuel ratio, particulate filter temperature, particulate filter backpressure, engine coolant pressure, or the like. Additional sensors, such as coolant temperature sensors, may be positioned in the cooling system. Correspondingly, the controller may control the engine and/or the rail vehicle by sending commands to various components such as the plurality of electric traction motors, the alternator/generator, the fuel injectors, valves (e.g., a thermostat valve or other coolant valve), the coolant pump, or the like. For example, the controller may control the operation of a restrictive element (e.g., such as a valve) in the engine cooling system. Other actuators controllable by the controller may be coupled to various locations in the rail vehicle.

Figure 2:
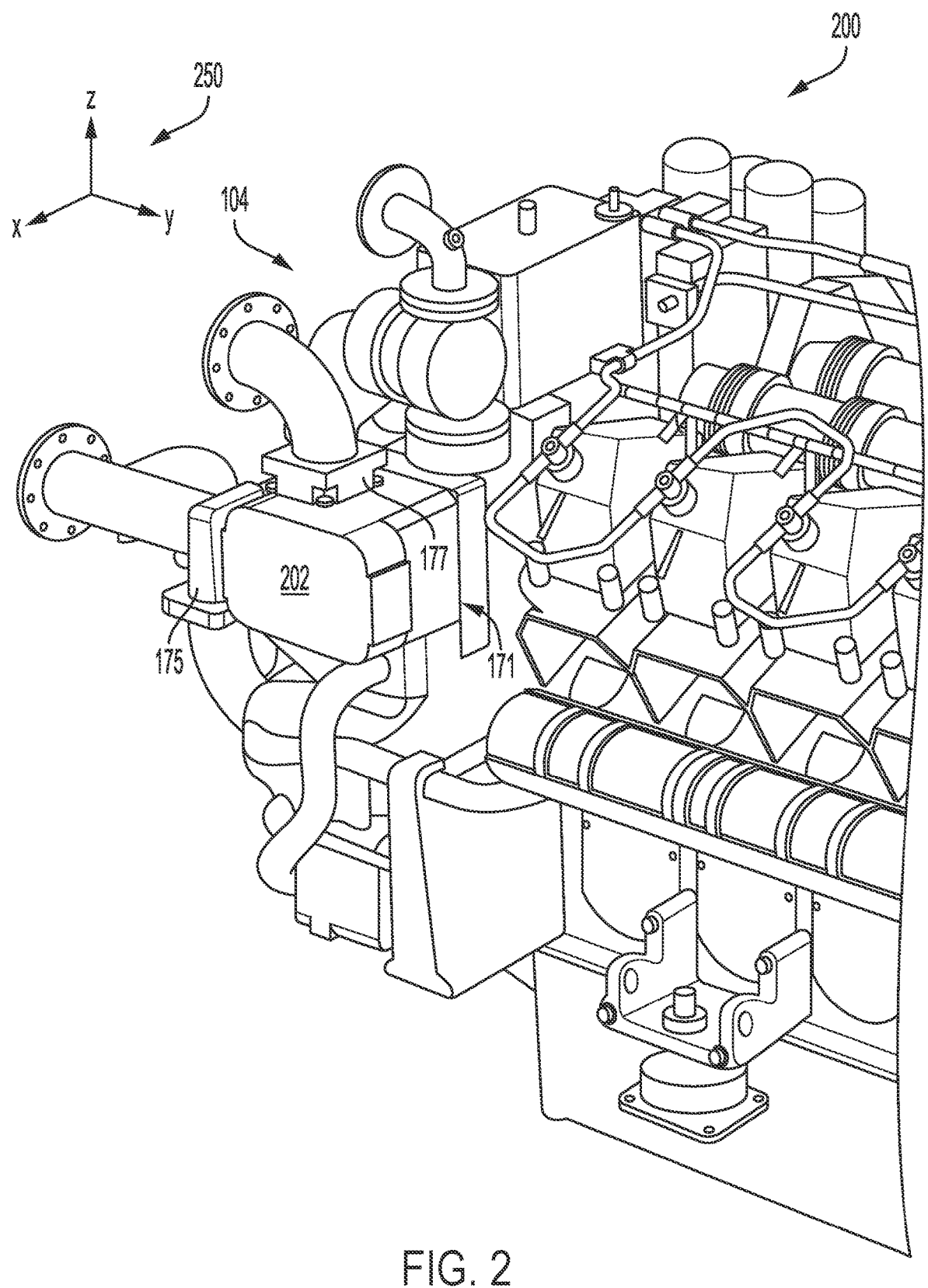
FIG. 2 shows a detail view of a portion of the engine with the thermostat housing.
Figure 3A:
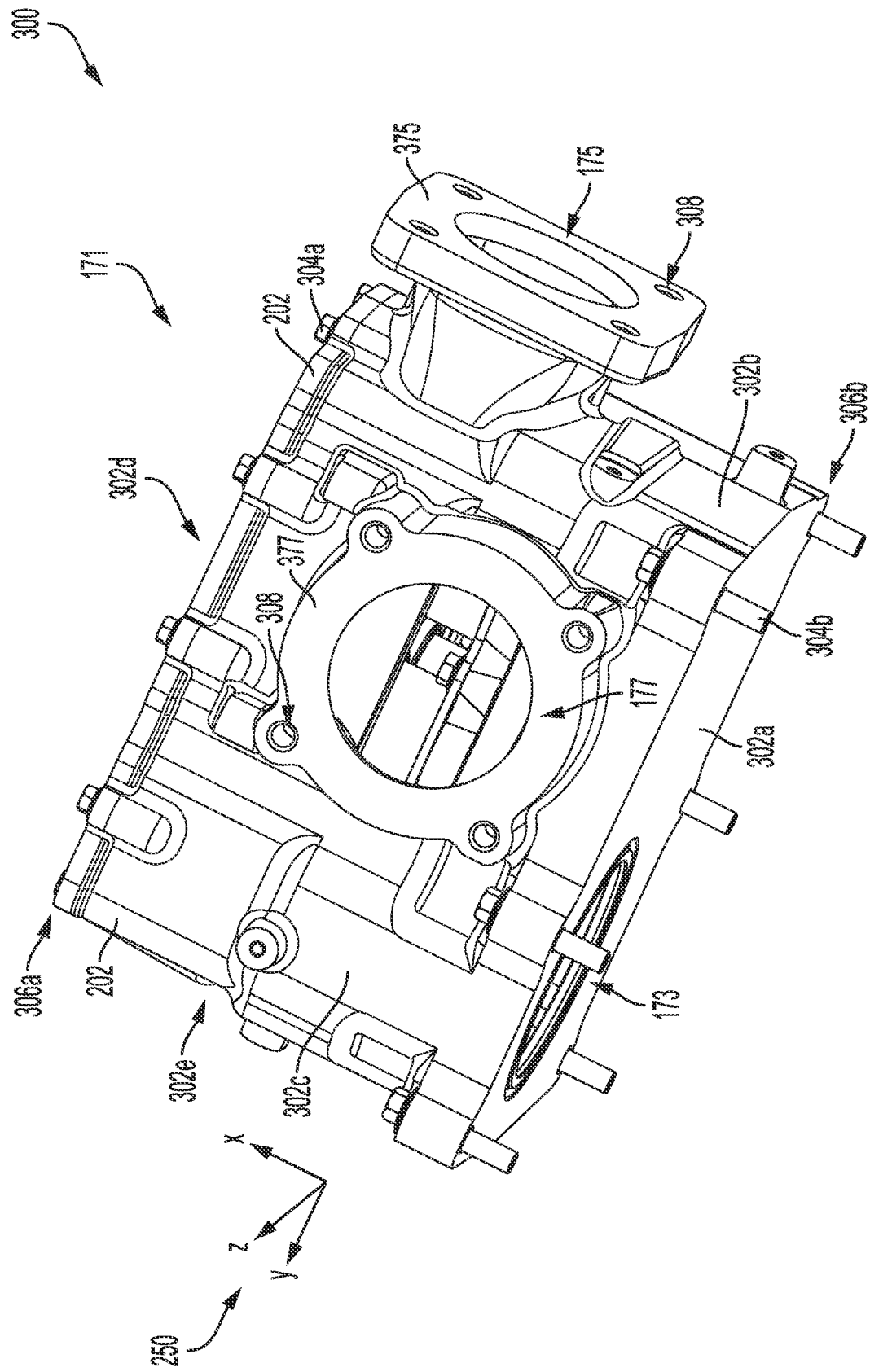
FIGS. 3A and 3B show perspective views of the thermostat housing.
Figure 3B:
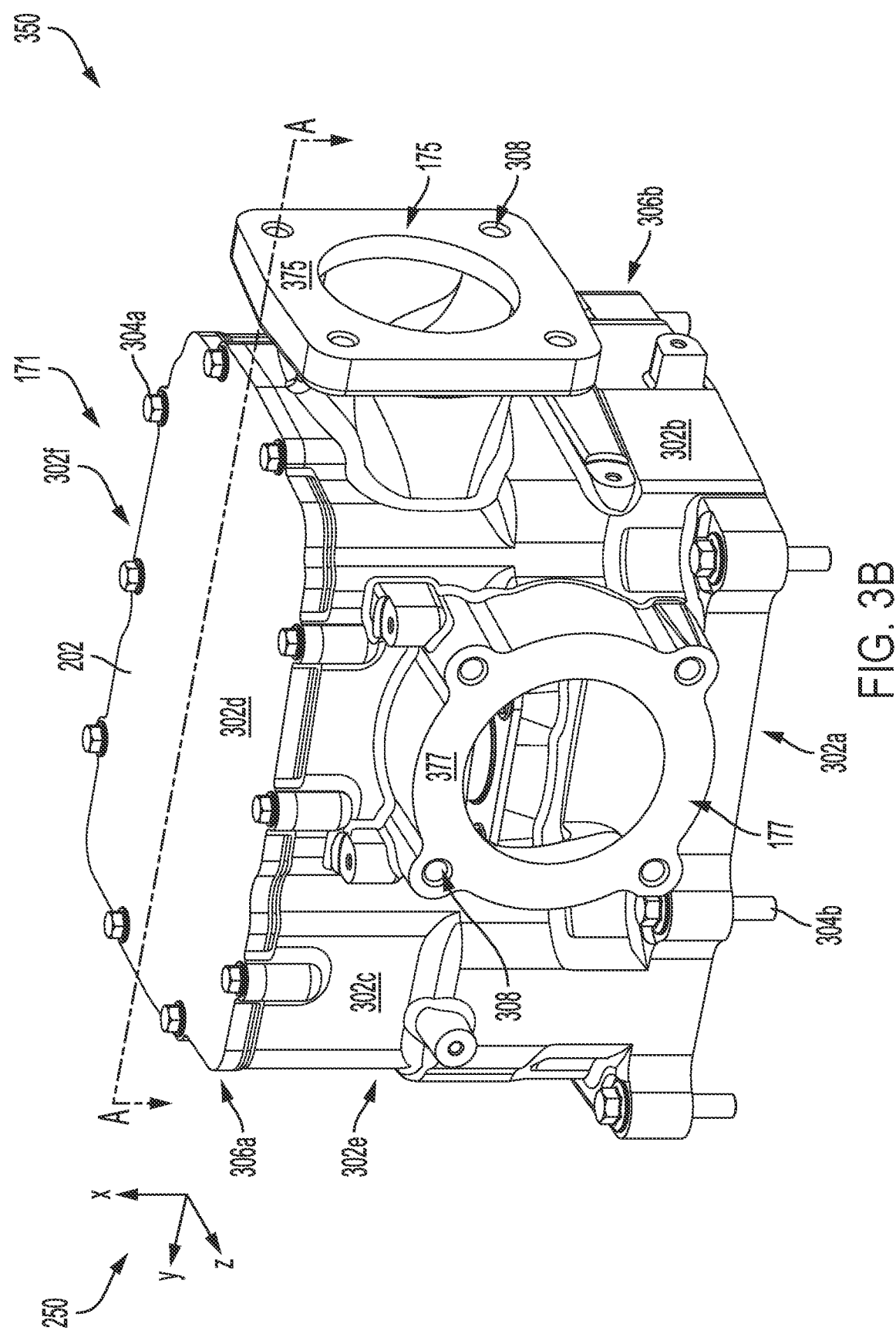
Figure 4A:
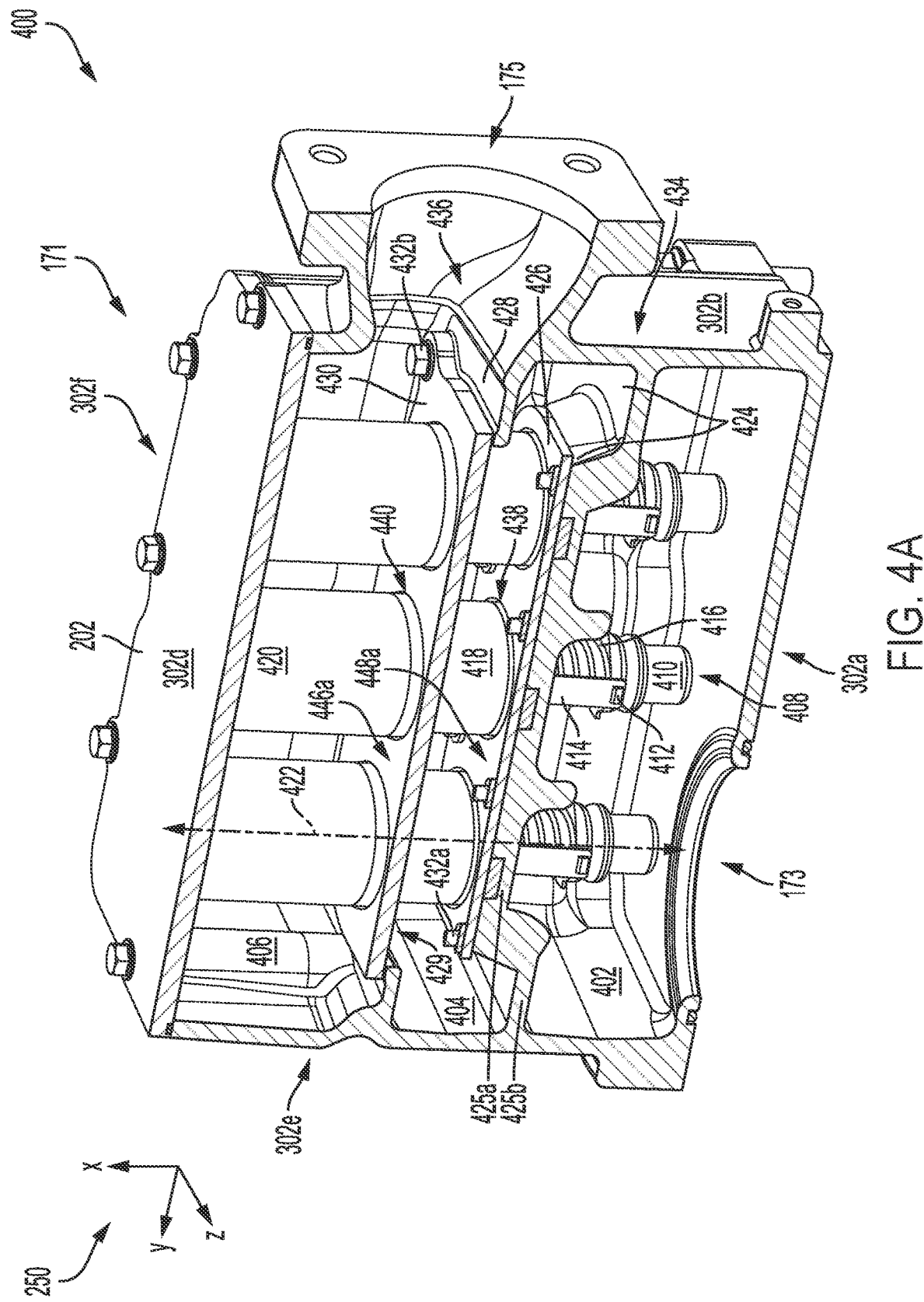
FIGS. 4A and 4B show cross-sectional views of the thermostat housing depicted in FIGS. 3A and 3B.
Figure 4B:
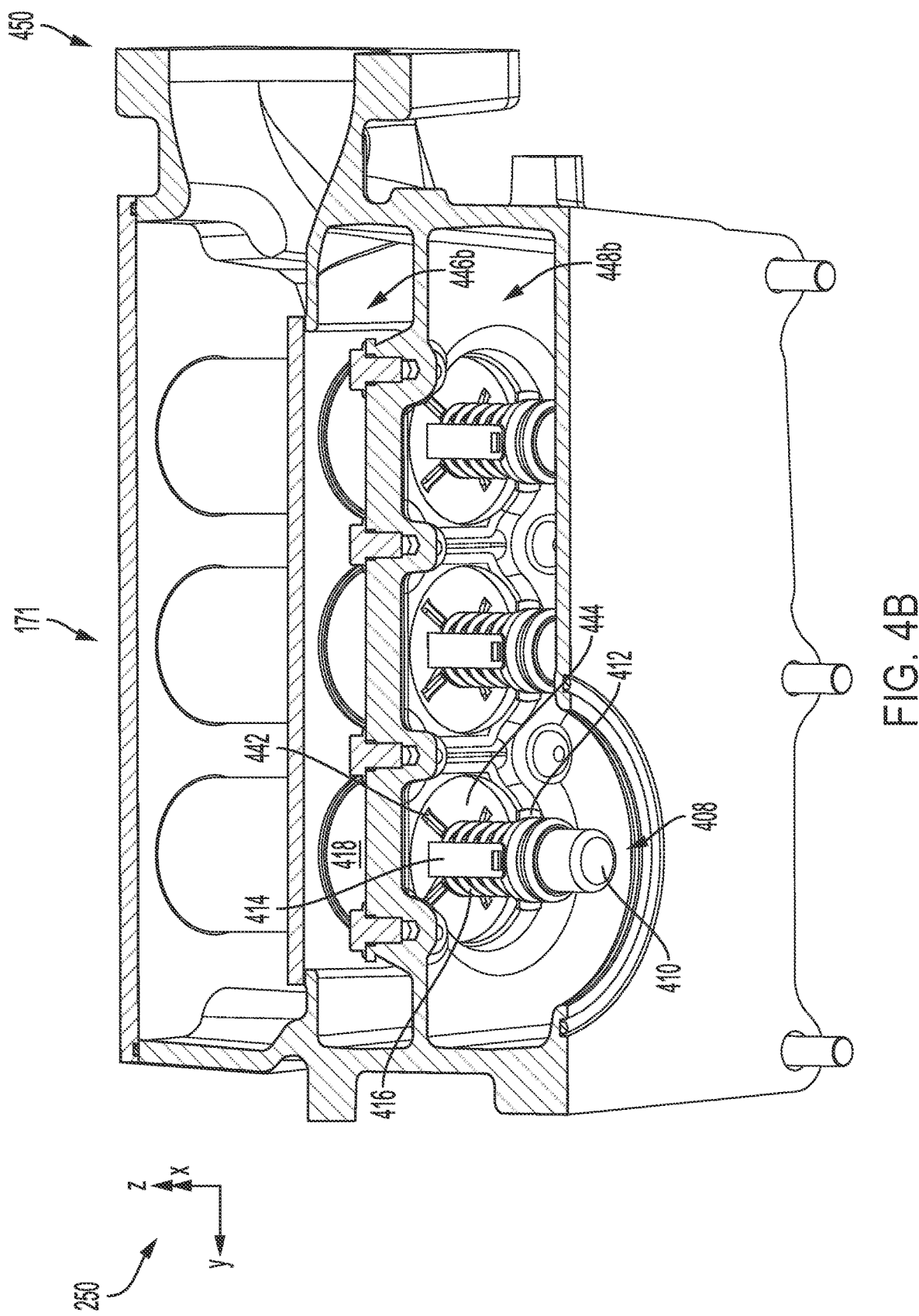

In one example, and as described in detail with reference to FIGS. 2-4B, a thermostat housing is provided for a plurality of thermostat valves, the thermostat housing having thickened and adjustable plate structures or configurations for laterally retaining each of the plurality of thermostat valves during axial movement thereof. The thermostat housing is depicted in context of an engine at FIG. 2, illustrating couplings of the engine to an engine cooling system via the thermostat housing. FIGS. 3A and 3B depict perspective views of the thermostat housing, illustrating various external features of the thermostat housing. A first cross-sectional view is shown in FIG. 4A, illustrating the plate configurations and the plurality of thermostat valves. Specifically, each of upper and lower plate configurations may be provided with a respective plate fastened to the thermostat housing. Accordingly, plates of different thicknesses, different gradients of thicknesses, different surface profiles, etc. may be selected and provided based at least in part on application-specific parameters. In one example, the upper plate configuration may include an upper plate fastened to an upper flange of the thermostat housing and the lower plate configuration may include a lower plate fastened to a lower partition of the thermostat housing, the lower partition providing additional thickness to the lower plate configuration to laterally retain the plurality of thermostat valves. A second cross-sectional view is shown in FIG. 4B, illustrating additional features of the plurality of thermostat valves.

Referring now to FIG. 2, a perspective detail view 200 depicts a portion of the engine with the thermostat housing. The thermostat housing may include a machined casing 202 which may at least partially enclose various other components of the thermostat housing, such as the one or more thermostat valves (not shown at FIG. 2). As described in detail below with reference to FIGS. 3A-4B, the casing may include one or more openings corresponding to the one or more inlets and outlets, such as the first and second outlets, of the thermostat housing. In some examples, and as shown at FIG. 2, the casing may form a portion of an external surface or casing of the engine, such that, for example, the thermostat housing may be readily accessed for maintenance of the various components included therein. In FIG. 2 and in FIGS. 3A-4B (described in more detail below), a set of reference axes 250 is provided for comparison between views shown, the set of reference axes including mutually perpendicular directional x, y, and z axes. Accordingly, the set of reference axes may define a three-dimensional space relative to the respective views of FIGS. 2-4B.

Referring now to FIGS. 3A and 3B, perspective views 300 and 350 are respectively depicted, showing the thermostat housing and aspects of the casing thereof. As shown, the casing may approximate a rectangular prism, e.g., the casing may be configured as a rectangular prism modified for openings for receiving fasteners or fluid couplings/passages, ornamental features, rounded edges and/or corners, etc. In one example, the casing may have circular openings for the inlet and the first and second outlets. However, the casing may be machined to approximate other geometric shapes or modified geometric shapes. Similarly, the openings for the inlet and the first and second outlets may independently be configured with alternate cross-sections, such as ellipses, polygons, etc. In one embodiment, the casing may have six machined faces: two faces 302a and 302d may be positioned opposite one another, approximately in parallel planes defined by the y and z axes; two faces 302b and 302e may be positioned opposite one another, approximately in parallel planes defined by the x and z axes; and two faces 302c and 302f may be positioned opposite one another, approximately in parallel planes defined by the x and y axes ("approximately in parallel planes" used here to describe pairs of planes within 5° of being parallel with one another).

The casing may include multiple pieces coupled to one another, e.g., retained by a plurality of fasteners 304a respectively received by a plurality of openings in each of the multiple pieces. For example, a first piece 306a having the face 302d may be affixed or otherwise coupled to a second piece 306b having the faces 302a, 302b, 302c, 302e, and 302f via the plurality of fasteners 304a. The casing may be affixed or otherwise coupled to an external surface of the engine, e.g., via a plurality of fasteners 304b respectively received by a plurality of openings in each of the casing and the external surface. For example, the second piece may be affixed or otherwise coupled to the external surface of the engine via the plurality of fasteners 304b. In other examples, the casing may be machined as a unitary piece or as multiple pieces non-detachably adhered to one another.

As shown, the inlet may be disposed in the face 302a, the first outlet may be disposed in the face 302b (the face 302b being adjacent and approximately perpendicular to the face 302a), and the second outlet may be disposed in the face 302c (the face 302c being adjacent and approximately perpendicular to each of the faces 302a and 302b). The first and second outlets may extend from the respective faces 302b and 302c along the y and z axes, respectively. First and second raised surfaces 375 and 377 may respectively circumscribe the first and second outlets in planes defined by the x and z axes and the x and y axes, respectively. The first and second raised surfaces may be substantially flat (where "substantially" as used hereat and elsewhere herein may be a qualifier meaning "effectively") and may include a plurality of openings 308 for receiving fasteners (e.g., for affixing or otherwise coupling passages to the first and second outlets).

A segmenting plane (indicated by line A-A) is shown in the perspective view of FIG. 3B, where the segmenting plane indicates the cross-sectional views illustrated in FIGS. 4A and 4B. The segmenting plane may be defined by the x and y axes and may bisect the faces 302a, 302b, 302d, and 302e.

Referring now to FIG. 4A, a first cross-sectional view 400 is depicted. The thermostat housing includes one or more thermostat valves 408 therein. For example, the thermostat housing may include a plurality of thermostat valves. Specifically, three thermostat valves are depicted in the first cross-sectional view 400 of FIG. 4A (as well as in FIG. 4B). The thermostat housing may include additional thermostat valves not explicitly shown in FIG. 4A (or FIG. 4B), e.g., three additional thermostat valves on the other side of the segmenting plane with respect to the z axis. In other embodiments, the thermostat housing may include fewer or greater thermostat valves.

As shown, the thermostat housing may be partitioned into a plurality of chambers. For example, the plurality of chambers may include a lower chamber 402, a middle chamber 404, and an upper chamber 406 positioned sequentially along the x axis. Specifically, the middle chamber may be positioned between and spatially separate the lower and upper chambers, such that whenever the heated coolant may traverse the middle chamber whenever the heated coolant passes from the lower chamber to the upper chamber. The chambers may be defined by interior faces of the casing. Specifically, the lower chamber may be defined by interior faces respectively opposite the faces 302a, 302b, 302c, 302e, and 302f (where face 302c is not explicitly shown at FIG. 4A) and a lower interior face 448b corresponding to a lower plate configuration 434 (where the lower interior face 448b is not explicitly shown at FIG. 4A); the middle chamber may be defined by interior faces respectively opposite the faces 302b, 302c, 302e, and 302f (where face 302c is not explicitly shown at FIG. 4A) and upper and lower interior faces 448a and 446b corresponding to the lower plate configuration 434 and an upper plate configuration 436, respectively (where the lower interior face 446b is not explicitly shown at FIG. 4A); and the upper chamber may be defined by interior faces respectively opposite the faces 302b, 302c, 302d, 302e, and 302f (where face 302c is not explicitly shown at FIG. 4A) and an upper interior face 446a corresponding to the upper plate configuration 436. In an exemplary embodiment, an interior volume of the thermostat housing may be partitioned among only the lower, middle, and upper chambers. However, in other embodiments, the interior volume may be partitioned among greater or fewer chambers in varying configurations.

As discussed above with reference to FIG. 1, the inlet may fluidly couple the thermostat housing to the engine, and each of the first and second outlets may fluidly couple the thermostat housing to the cooling system. Specifically, the inlet may fluidly couple the lower chamber to the engine, the second outlet may fluidly couple the middle chamber to the radiator of the cooling system, and the first outlet may fluidly couple the upper chamber to the coolant pump of the cooling system.

The plurality of thermostat valves may extend through the chambers along the x axis. Actuation of any one or more of the one or more thermostat valves (e.g., via expanding/contracting movement parallel to the x axis along dashed bidirectional line 422) may fluidly couple the lower chamber to the middle chamber via one or more corresponding lower openings 438 and/or the middle chamber to the upper chamber via one or more corresponding upper openings 440. As shown, a cross-section of each of the lower openings and the upper openings within a plane defined by the y and z axes may be circular in shape. However, the cross-sections of the lower and upper openings may independently be configured in other geometric shapes, such as rectangular, square, polygonal, elliptical, etc. configurations. Further, each of the lower openings and the upper openings may be machined to be equivalent in size to each other of the lower openings and the upper openings. Alternatively, the lower openings and the upper openings may be machined to various sizes not necessarily equivalent to one another. In any case, each pair of lower and upper openings along the x axis may be machined to be equivalent in size to one another (even if not equivalent in size to remaining pairs of lower and upper openings), such that the pairs of lower and upper openings may be defined fit (e.g., clearance fit) to respective shafts 418 of the thermostat valves extending therethrough.

When heated coolant passes into the lower chamber via the inlet, respective thermal sensing elements 410 of the plurality of thermostat valves may detect a change (e.g., increase) in temperature. The thermal sensing elements may respond to the temperature change. A suitable thermoset valve may expand or contract as the temperature increases or decreases, respectively. Suitable thermal sensing elements may be composed of wax, thermoplastic, thermoset, or metal. Suitable metals may include shape memory alloys or relatively low melting materials, such as phase change alloys.

Upon expansion of the thermal sensing elements, springs 416 of the plurality of thermostat valves may extend along the dashed bidirectional line 422. The springs may correspondingly actuate the thermostat valves by unsealing the lower openings 438 and/or the upper openings 440. The thermal sensing elements may be located partially or wholly within the springs, or may be partially or wholly adjacent to the springs. Suitable thermal sensing elements may extend at least partially within respective springs. During expansion of the thermal sensing elements, the springs may expand within respective guiding structures 414 (the guiding structures being coupled to flanges of respective retaining structures 412, the retaining structures being affixed or otherwise coupled to respective thermal sensing elements), such that respective shafts 418 may be moved to unseal the lower openings and/or the upper openings. Accordingly, upon movement of the shafts, the heated coolant may pass into the middle chamber via the lower openings and/or the upper chamber via the upper openings (after first passing through the middle chamber via the lower openings). When passed into the middle chamber, the heated coolant may exit the thermostat housing via the second outlet (not explicitly shown at FIG. 4A) to be cooled by the radiator (e.g., 152). When passed into the upper chamber, the heated coolant may exit the thermostat housing via the first outlet to be recirculated by the pump.

Upon actuation of the thermal sensing elements by the heated coolant, the lower openings and the upper openings may be unsealed simultaneously, such that the heated coolant may be more evenly distributed to the radiator and the pump via the second and first outlets, respectively. Alternatively, upon actuation of the thermal sensing elements by the heated coolant, the lower openings may be unsealed before the upper openings, such that an amount of the heated coolant may pass through the middle chamber and to the radiator via the second outlet prior to any of the heated coolant entering the upper chamber and passing therethrough to the pump via the first outlet. Further, depending on a configuration (e.g., overall number and placement) of the thermostat valves, the lower openings may be unsealed simultaneously or asynchronously with one another, as may the upper openings be unsealed simultaneously or asynchronously with one another.

One or more stoppers 420 may be affixed or otherwise coupled to the interior face of the casing opposite the face 302*d*, restricting movement of the shafts along the dashed bidirectional line 422 upon expansion/contraction of the springs. Accordingly, a given spring may be considered maximally expanded when a corresponding shaft is in face-sharing contact with a corresponding stopper. However, in some examples, the springs may not maximally expand during expansion, such that the shafts do not contact the stoppers.

As shown, the lower chamber and the middle chamber may be separated by the lower plate configuration. The lower plate configuration may include a lower plate 426 coupled to a lower partition 424 of the casing, e.g., such that at least a portion of the lower plate may be in face-sharing contact with at least a portion of the lower partition. For example, the lower plate may be fastened to the lower partition via a plurality of fasteners 432*a*. Accordingly, the lower plate may be removed and replaced with a lower plate of different (e.g., increased or decreased) thickness. The different thickness of the lower plate may be selected based on one or more application-specific parameters (e.g., an expected range of a temperature of the heated coolant and/or a rate at which the temperature of the heated coolant may be expected to change within the thermostat housing during engine operation). Additionally or alternatively, the lower partition may be machined or built to a different thickness (e.g., based on the one or more application-specific parameters). As such, an overall thickness of the lower plate configuration may be increased as desired, laterally retaining the thermostat valves via the lower openings (e.g., the thermostat valves may be restricted from moving along the y and z axes, thereby mitigating unseating of the thermostat valves during actuation thereof).

As shown, the lower plate may be positioned above the lower partition (e.g., with respect to the x axis) upon coupling thereto. The lower partition may form a unitary piece with the casing or at least one piece thereof (e.g., the second piece 306*b*), the lower partition positioned between the lower and middle chambers. The lower partition may include a central portion 425*a* circumscribed by a perimeter portion 425*b*, the central portion raised upwards (e.g., with respect to the x axis) from the perimeter portion and in face-sharing contact with the lower plate. The central portion may include openings formed therein, the openings defined fit (e.g., clearance fit) to the shafts of the thermostat valves. The lower plate may also include openings formed therein, the openings defined fit (e.g., clearance fit) to the shafts of the thermostat valves. The openings of each of the lower partition and the lower plate may be aligned with respect to the x axis upon coupling of the lower plate to the lower partition (e.g., orthographic projections of the openings of the lower plate on a plane defined by the y and z axes may substantially completely overlap with respective orthographic projections of the openings of the lower partition on the plane defined by the y and z axes). Accordingly, the lower openings may be formed by the openings within each of the lower partition and the lower plate and respectively clearance fit to the thermostat valves (e.g., to the shafts), such that the thermostat valves may seal the lower openings upon contraction of the springs.

As further shown, the middle chamber and the upper chamber may be separated by the upper plate configuration. The upper plate configuration may include an upper plate 430 coupled to an upper flange 428 of the casing, e.g., such that at least a portion of the upper plate may be in face-sharing contact with at least a portion of the upper flange. For example, the upper plate may be fastened to the upper flange via a plurality of fasteners 432*b*. Accordingly, the upper plate may be removed and replaced with an upper plate of a different (e.g., increased or decreased) thickness. The different thickness of the upper plate may be selected based on one or more application-specific parameters (e.g., the expected range of the temperature of the heated coolant and/or the rate at which the temperature may be expected to change within the thermostat housing during engine operation). An overall thickness of the upper plate configuration may be increased as desired, laterally retaining the thermostat valves via the upper openings (e.g., the thermostat valves may be restricted from moving along the y and z axes, thereby mitigating unseating of the thermostat valves during actuation thereof).

As shown, the upper plate may be positioned above the upper flange (e.g., with respect to the x axis) upon coupling thereto. The upper flange may form a unitary piece with the casing or at least one piece thereof (e.g., the second piece 306*b*), the upper flange positioned between the middle and upper chambers and circumscribing a central opening 429 therebetween. The upper plate may include the upper openings formed therein, the upper openings respectively clearance fit to the thermostat valves (e.g., to the shafts) such that the thermostat valves may seal the upper openings upon contraction of the springs. Specifically, the upper plate may be positioned such that the upper openings may be aligned over the central opening of the upper flange with respect to the x axis upon coupling of the upper plate to the upper flange (e.g., orthographic projections of the upper openings on a plane defined by the y and z axes may substantially completely overlap with an orthographic projection of the central opening on the plane defined by the y and z axes).

Because the heated coolant enters the thermostat housing via the inlet and first passes through the lower chamber before entering the middle and upper chambers, the heated coolant may pass through the lower plate configuration (e.g., separating the lower and middle chambers) at a higher temperature than when the heated coolant passes through the upper plate configuration (e.g., separating the middle and upper chambers). Accordingly, a first amount of the heated coolant exiting the thermostat housing via the second outlet fluidly coupled to the middle chamber may have a higher temperature than a second amount of the heated coolant exiting the first outlet fluidly coupled to the upper chamber. Further, based on a rate at which the springs of the thermal sensing elements expand (which may in turn be based on a rate at which the thermal sensing elements themselves expand), the heated coolant may be delayed from entering the upper chamber, resulting in a larger temperature difference between the second amount of the heated coolant and the first amount of the heated coolant upon the second amount eventually flowing into the upper chamber (e.g., upon the spring expanding sufficient to unseal the upper openings). Thus, the heated coolant passing to the radiator via the second outlet (e.g., the first amount of the heated coolant) may have a higher temperature than the heated coolant passing to the pump via the first outlet (e.g., the second amount of heated coolant).

Referring now to FIG. 4B, a second cross-sectional view 450 is depicted, showing the thermostat housing including the one or more thermostat valves therein. Though the x axis appears to substantially overlap the z axis at FIG. 4B, it will be appreciated that the z axis remains perpendicular to the x axis (the z axis extending in a direction out of and above a plane of the second cross-sectional view and the x axis extending in a direction into and under the plane of the second cross-sectional view).

As described in detail above with respect to FIG. 4A, the one or more thermostat valves may include respective thermal sensing elements which may extend at least partially within respective springs. The springs may be retained by respective guiding structures coupled to the flanges of respective retaining structures. The springs may be seated at a first end against the respective retaining structures and at an opposite, second end against respective sets of flanges 442 of the respective shafts. The sets of flanges may be affixed to and extend downwards (e.g., with respect to the x axis) from respective lower surfaces 444 of the respective shafts. As shown, each of the sets of flanges may be configured in an "X" shape. However, other configurations of flanges which substantially evenly distribute a force of the respective springs upon expansion/contraction thereof may be utilized.

A thermostat housing may be provided with a plurality of thermostat valves with reduced tendency to unseat during use. In some examples, the thermostat housing may have both upper and lower plate configurations. Each of the upper and lower plate configurations may include a plurality of openings respectively defined fit (e.g., clearance fit) to the plurality of thermostat valves. Specifically, the upper plate configuration may include an upper plate fastened to an upper flange and the lower plate configuration may include a lower plate fastened to a lower partition. A technical effect of providing the upper and lower plate configurations is that thicknesses thereof may be varied (e.g., increased) to laterally retain the plurality of thermostat valves during axial movement thereof. As an example, a thickness of the lower partition may be increased. As another example, each of the upper and lower plates may be detached and replaced with plates having a thickness selected based on application-specific parameters. Accordingly, precision control of fluids passing through the thermostat housing may be maintained.

In one example, an internal combustion engine system includes a thermostat housing. The thermostat housing includes a plurality of chambers separated by a plurality of plate configurations (or plate structures) and one or more thermostat valves positioned within the thermostat housing. At least one of the plurality of plate configurations or structures has one or more openings that are defined fit to the one or more thermostat valves, and respective plates fastened to a casing of the thermostat housing. In one embodiment, the internal combustion engine system has a plurality of openings of the plurality of plate configurations laterally retaining the one or more thermostat valves during axial movement thereof. In one embodiment, the internal combustion engine system has the plurality of plate configurations with an upper plate configuration and a lower plate configuration. In one embodiment, the internal combustion engine system has the plurality of chambers, with an upper chamber, a middle chamber, and a lower chamber, and the upper chamber and the middle chamber are separated by the upper plate configuration, and the middle chamber and the lower chamber are separated by the lower plate configuration. In one embodiment, the internal combustion engine system has the upper plate configuration with an upper plate fastened to an upper flange of the casing. In one embodiment, the internal combustion engine system has the upper plate configuration with one or more upper openings, and the one or more upper openings are formed in the upper plate and respectively defined fit to the one or more thermostat valves. In one embodiment, the internal combustion engine system has the lower plate configuration with a lower plate fastened to a lower partition of the casing. In one embodiment, the internal combustion engine system has the lower plate configuration with one or more lower openings, the one or more lower openings being formed in the lower plate and the lower partition and respectively clearance fit to the one or more thermostat valves. In one embodiment, the internal combustion engine system is a diesel internal combustion engine system. In one embodiment, the diesel internal combustion engine system is a high-speed diesel engine. In one embodiment, the internal combustion engine system is coupled to and is a power source for a vehicle. The vehicle may be a rail vehicle, a marine vessel, a mining vehicle, and the like.

FIGS. 2-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2-4B are drawn approximately to scale, although other dimensions or relative dimensions may be used.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An internal combustion engine system, comprising:
    a thermostat housing, the thermostat housing including a lower chamber, a middle chamber, and an upper chamber separated by a plurality of plate configurations; and
    a plurality thermostat valves positioned within the thermostat housing,
    wherein the plurality of plate configurations comprises:
        a plurality of openings defined fit to the one or more thermostat valves; and
        a lower plate and an upper plate fastened to a casing of the thermostat housing;
    wherein the fluid inlet brings coolant into the lower chamber; and
    wherein the plurality of thermostat valves comprises thermal sensing elements, the thermal sensing elements are contacted by the coolant in the lower chamber and the thermostat valves expand from a first position to a second position at a first temperature, the first position blocking flow to the middle chamber, the second position unseating the thermostat valves from the openings in the lower plate and allowing the coolant to flow from the lower chamber to the middle chamber, the thermostat valves expanding from the second position to a third position at a second temperature, which is greater than the first temperature, and the third position unseating the thermostat valves from the openings in the upper plate and allowing the coolant to flow from the middle chamber to the upper chamber.

2. The internal combustion engine system of claim 1, wherein the plurality of openings of the plurality of plate configurations laterally retains the one or more thermostat valves during axial movement thereof.

3. The internal combustion engine system of claim 1, wherein the upper chamber and the middle chamber are separated by an upper plate configuration, and
    wherein the middle chamber and the lower chamber are separated by a lower plate configuration.

4. The internal combustion engine system of claim 1, wherein an upper plate configuration comprises the upper plate fastened to an upper flange of the casing.

5. The internal combustion engine system of claim 1, wherein a lower plate configuration comprises the lower plate fastened to a lower partition of the casing.

6. The internal combustion engine system of claim 4, wherein the lower plate configuration comprises one or more lower openings of the plurality of openings, the one or more lower openings being formed in the lower plate and the lower partition and respectively clearance fit to the one or more plurality of thermostat valves.

7. The internal combustion engine system of claim 1, wherein the internal combustion engine system is a diesel internal combustion engine system.

8. The internal combustion engine system of claim 1, wherein the internal combustion engine system is configured as a power source in a rail vehicle.

9. The internal combustion engine system of claim 1, wherein the fluid in the middle chamber has a higher temperature than a fluid in the upper chamber.

10. The internal combustion engine system of claim 1, wherein each of the thermostat valves flows fluid to the middle chamber and the upper chamber depending on position.

11. The internal combustion engine system of claim 10, wherein the inlet receives heated coolant from the internal combustion engine;
    the second outlet outlets coolant from the middle chamber to the coolant pump for recirculation of the heated coolant; and
    the first outlet outlets coolant from the upper chamber to the radiator for cooling of the heated coolant.

12. An internal combustion engine system, comprising:
    a thermostat housing, comprising a first piece and a second piece, the second piece comprising:
        a casing including each of a flange and a partition, where the flange is positioned between a first chamber of the thermostat housing and a second chamber of the thermostat housing, and wherein the partition is positioned between the second chamber and a third chamber of the thermostat housing;
    a first plate positioned between the first chamber and the second chamber and removably fastened to the flange via first fasteners, the first plate comprising first openings; and
    a second plate positioned between the second chamber and the third chamber and removably fastened to the partition via second fasteners, the second plate comprising second openings,
    the first piece of the housing removably fastened to an open end of the second piece; and
    a plurality of thermostat valves each selectively permitting fluid flow from the first chamber to the second chamber and each selectively permitting flow from the second chamber to the third chamber, the plurality of thermostat valves comprising thermal sensing elements, the thermal sensing elements contacted by coolant in the first chamber and the thermostat valves expanding from a first position to a second position at a first temperature, the first position blocking flow to the second chamber, the second position unseating the thermostat valves from the first openings and allowing the coolant to flow from the first chamber to the second chamber, the thermostat valves expanding from the second position to a third position at a second temperature, which is greater than the first temperature, and the third position unseating the thermostat valves from the second openings and allowing the coolant to flow from the second chamber to the third chamber.

13. The internal combustion engine system of claim 12, wherein the plurality of thermostat valves is clearance fit to the first openings,
    wherein the plurality of thermostat valves is clearance fit to respective openings in the partition, and
    wherein the plurality of thermostat valves is clearance fit to the second openings.

14. The internal combustion engine system of claim 12, wherein the internal combustion engine system is a diesel internal combustion engine system configured as a power source for a rail vehicle.

15. A system, comprising:
an internal combustion engine;
a thermostat housing fluidly coupled to the internal combustion engine, the thermostat housing comprising:
an upper plate configuration partitioning an upper chamber and a middle chamber of the thermostat housing, the upper plate configuration comprising an upper plate;
a lower plate configuration partitioning the middle chamber and a lower chamber of the thermostat housing, the lower plate configuration comprising a lower plate; and
an inlet, a first outlet connecting the upper chamber to an exterior of the thermostat housing, and a second outlet connecting the middle chamber to the exterior of the thermostat housing; and
a plurality of thermostat valves positioned within the thermostat housing, each of the plurality of thermostat valves respectively clearance fit to a plurality of upper openings in the upper plate such that each of the upper openings connects the middle chamber to the first outlet, and each of the plurality of thermostat valves further respectively clearance fit to a plurality of lower openings in the lower plate such that each of the lower openings connects the lower chamber to the second outlet;
the plurality of thermostat valves comprising thermal sensing elements, the thermal sensing elements contacted by coolant in the lower chamber and the thermostat valves expanding from a first position to a second position at a first temperature, the first position blocking flow to the middle chamber, the second position unseating the thermostat valves from the lower openings and allowing the coolant to flow from the lower chamber to the middle chamber, the thermostat valves expanding from the second position to a third position at a second temperature, which is greater than the first temperature, and the third position unseating the thermostat valves from the upper openings and allowing the coolant to flow from the middle chamber to the upper chamber.

16. The system of claim 15, wherein the system is a diesel-electric locomotive for which the internal combustion engine is configured as a power source.

17. The system of claim 15, wherein the cooling system comprises a radiator and a coolant pump,
wherein the inlet is configured to receive heated coolant from the internal combustion engine,
wherein the first outlet fluidly couples the upper chamber to the radiator for cooling of the heated coolant, and
wherein the second outlet fluidly couples the middle chamber to the coolant pump for recirculation of the heated coolant.

18. The system of claim 15, wherein the casing includes six faces and approximates a rectangular prism,
wherein the inlet is disposed in a first face of the six faces,
wherein the first outlet is disposed in a second face of the six faces, the second face approximately perpendicular to the first face, and
wherein the second outlet is disposed in a third face of the six faces, the third face approximately perpendicular to the first and second faces.

19. The system of claim 15, wherein the thermostat housing comprises a casing at least partially enclosing the plurality of thermostat valves, the casing including first, second, third, fourth, fifth, and sixth faces and first, second, third, fourth, fifth, and sixth interior faces respectively opposite the first, second, third, fourth, fifth, and sixth faces,
wherein the upper chamber is defined by the first, second, third, fourth, and fifth interior faces of the casing and a first upper interior face corresponding to the upper plate configuration,
wherein the middle chamber is defined by the second, third, fourth, and fifth interior faces of the casing, a first lower interior face corresponding to the upper plate configuration, and a second upper interior face corresponding to the lower plate configuration, and
wherein the lower chamber is defined by the second, third, fourth, fifth, and sixth interior faces of the casing and a second lower interior face corresponding to the lower plate configuration.

* * * * *